Sept. 29, 1942.   J. JANOSKOVITS ET AL   2,297,561
MACHINE FOR APPLYING CEMENT TO FLEXIBLE STRIPS
Filed Oct. 28, 1940    5 Sheets-Sheet 4
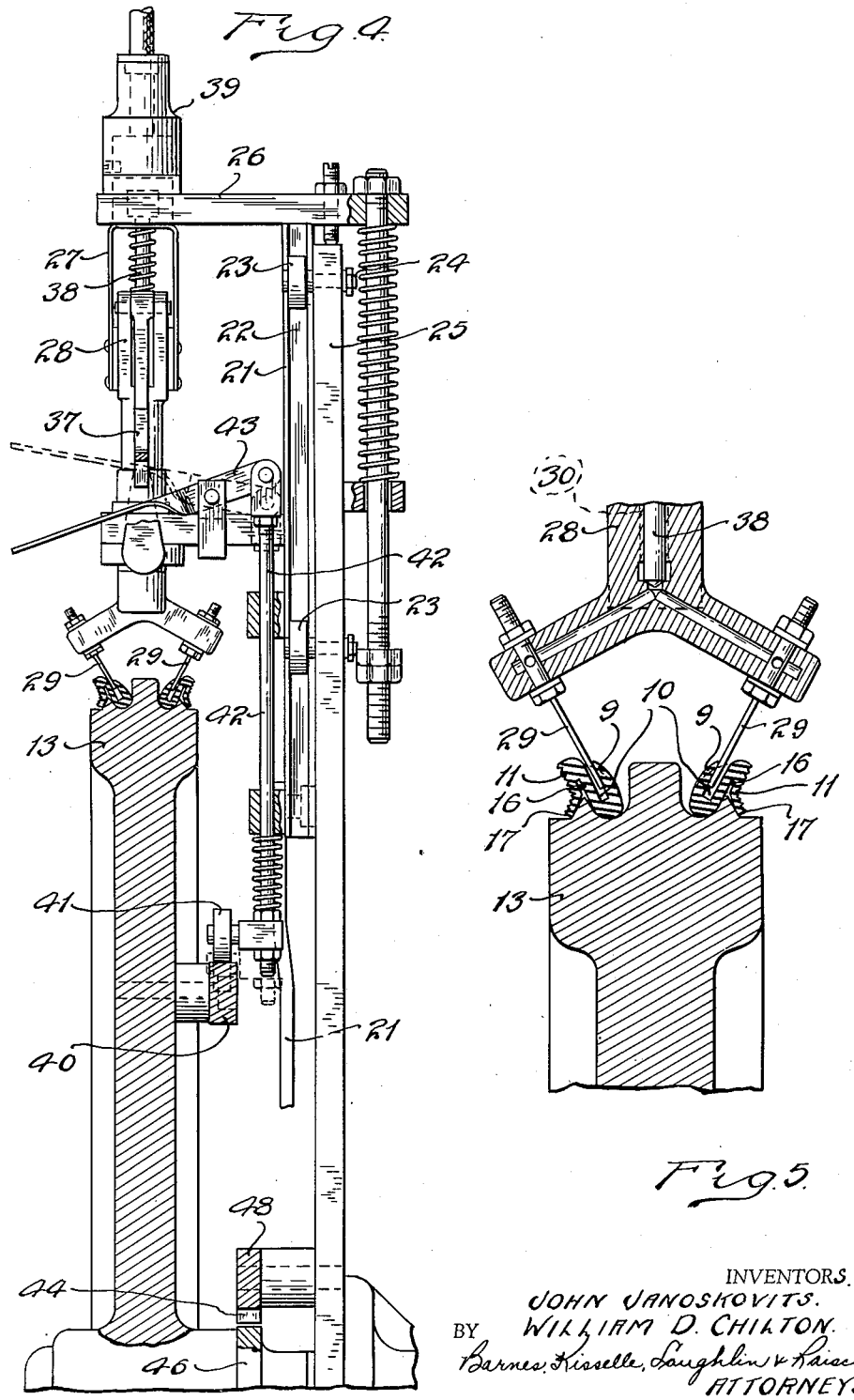
INVENTORS.
JOHN JANOSKOVITS.
WILLIAM D. CHILTON.
BY Barnes, Kisselle, Laughlin & Raisch
ATTORNEYS.

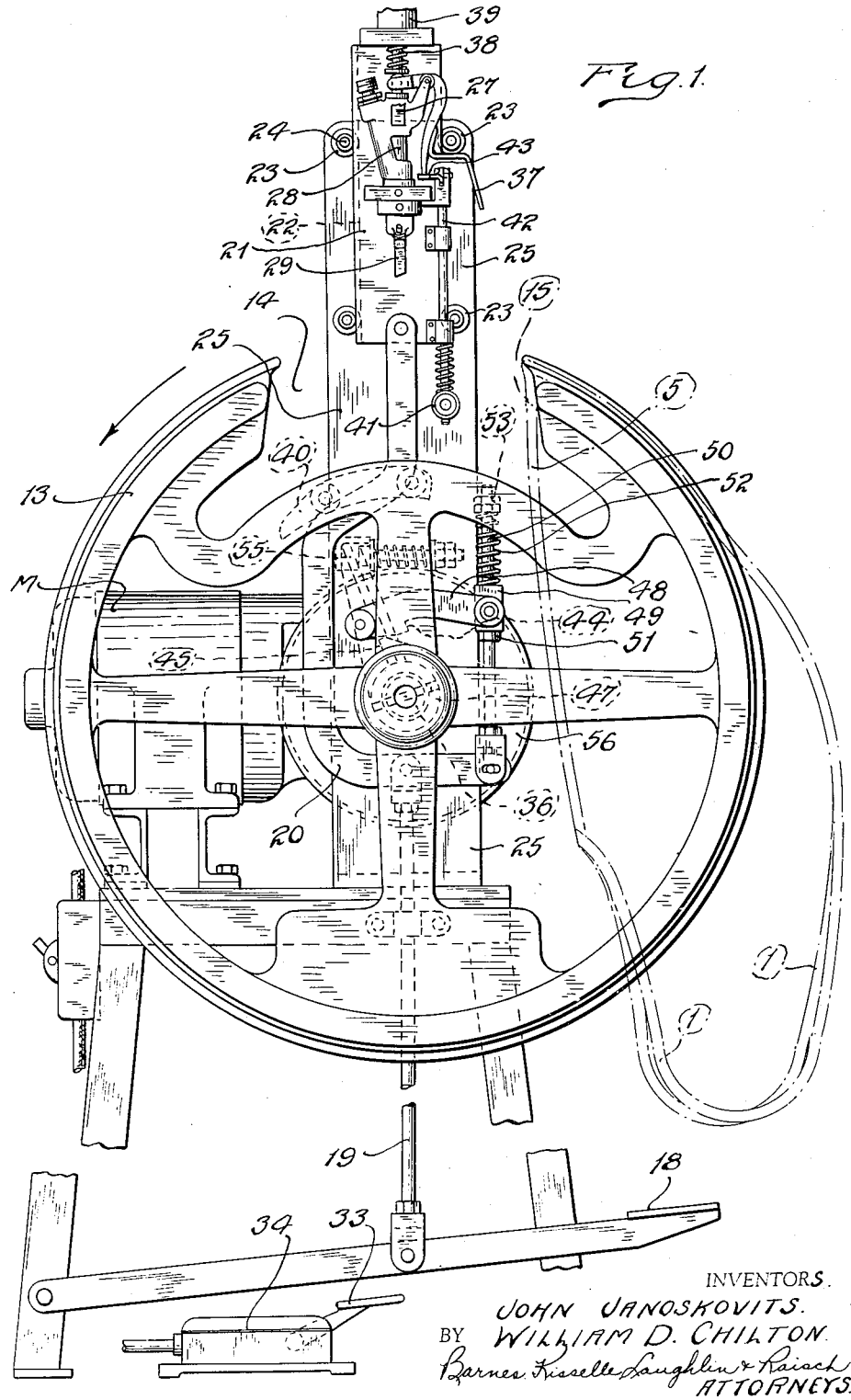

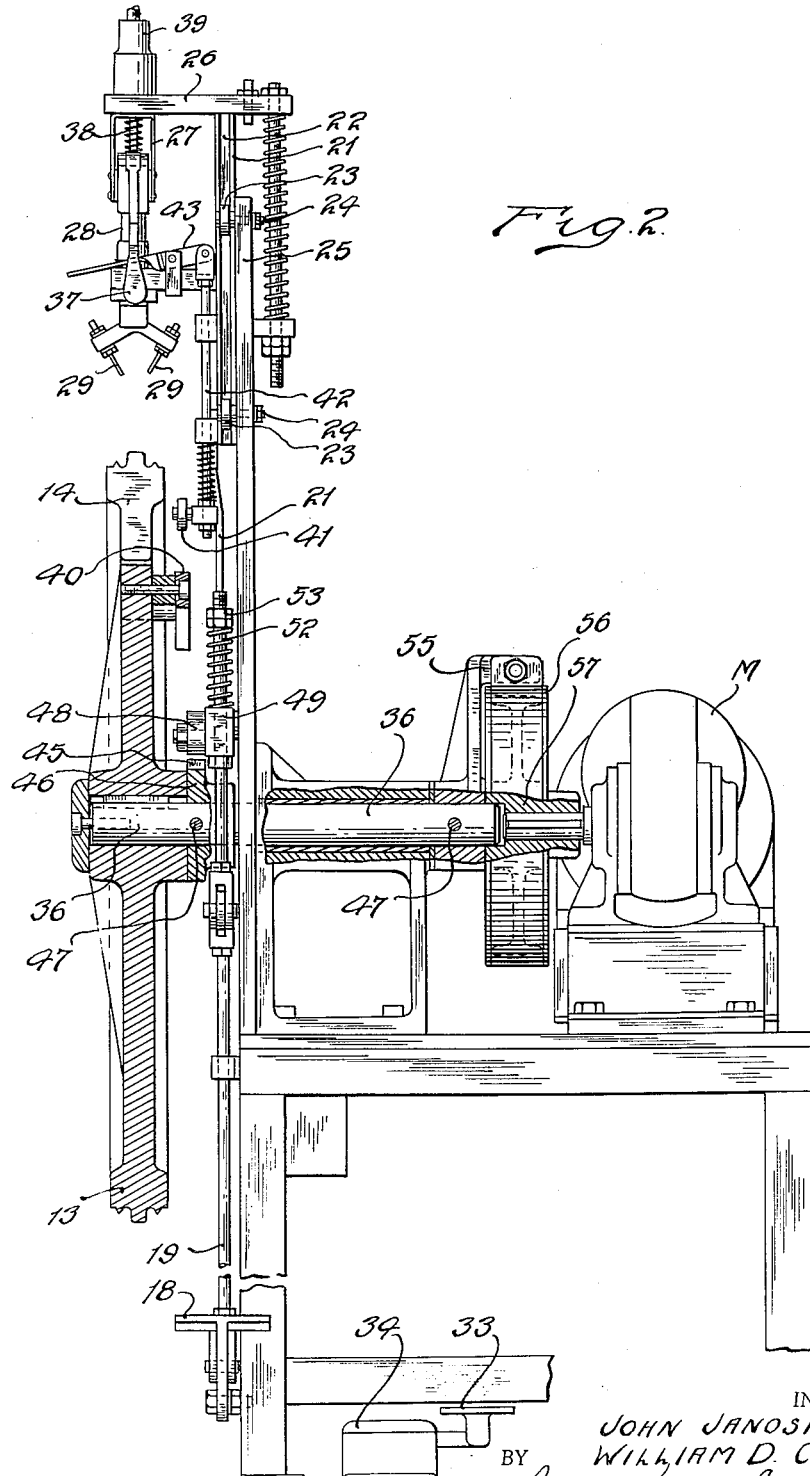

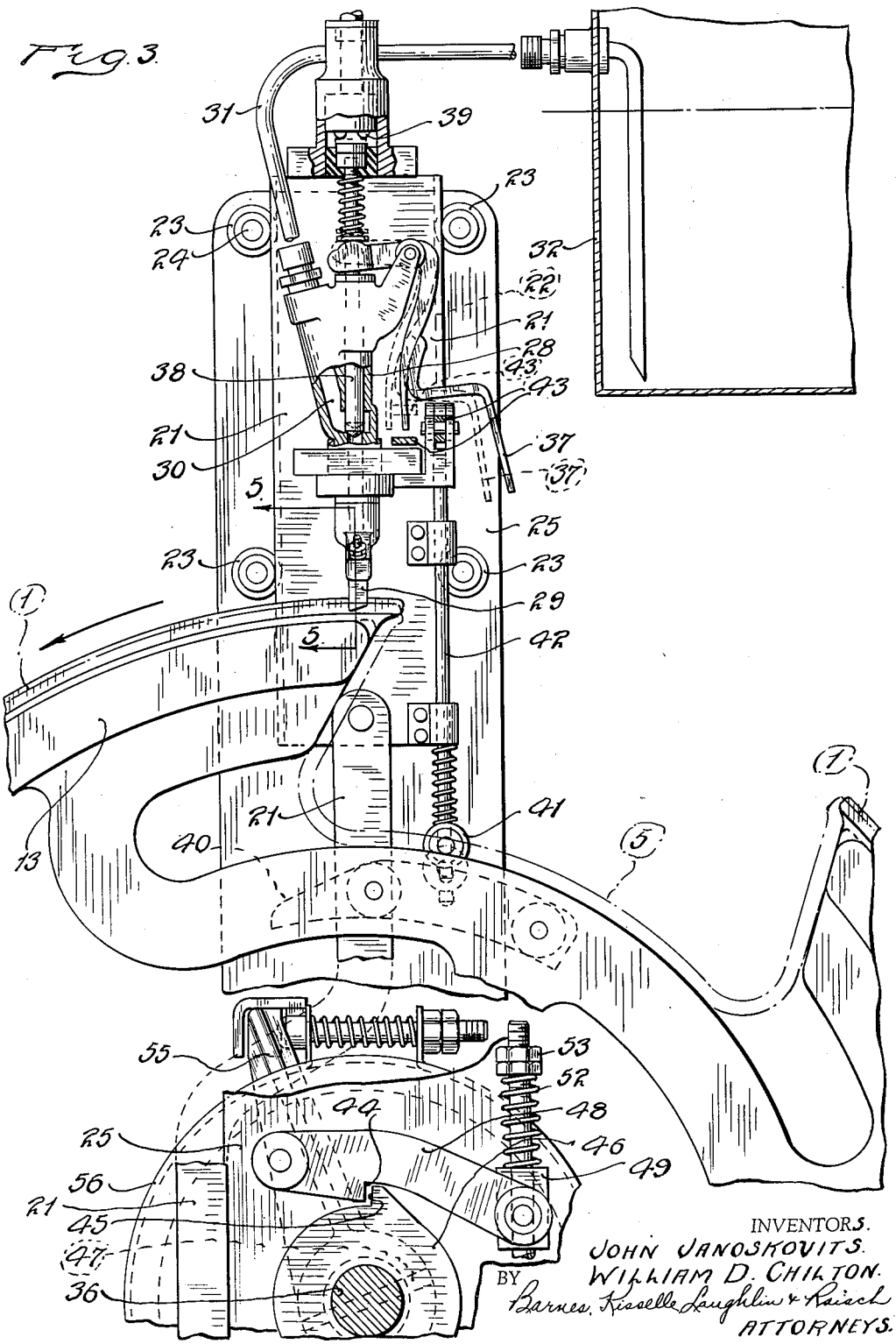

Sept. 29, 1942. J. JANOSKOVITS ET AL 2,297,561
MACHINE FOR APPLYING CEMENT TO FLEXIBLE STRIPS
Filed Oct. 28, 1940 5 Sheets-Sheet 5
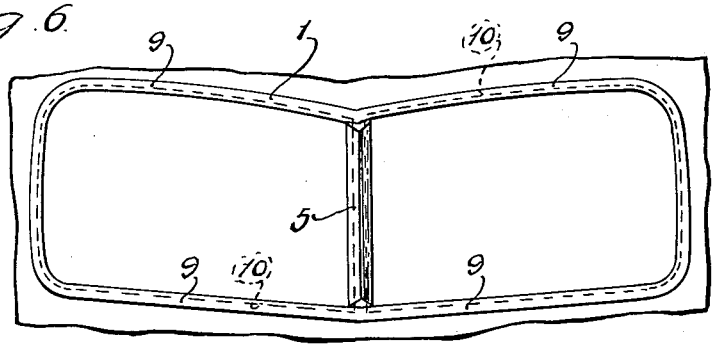
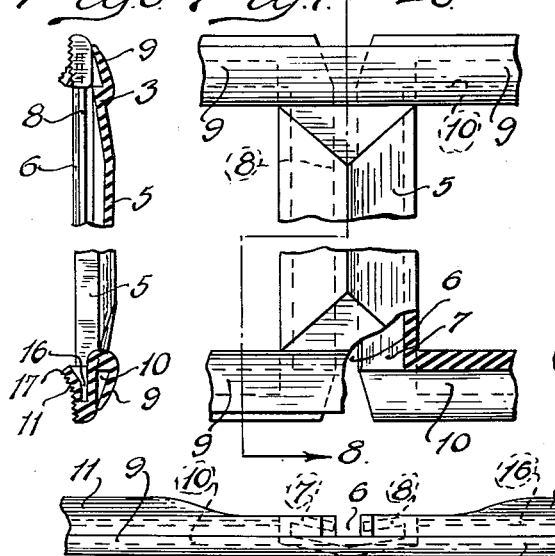
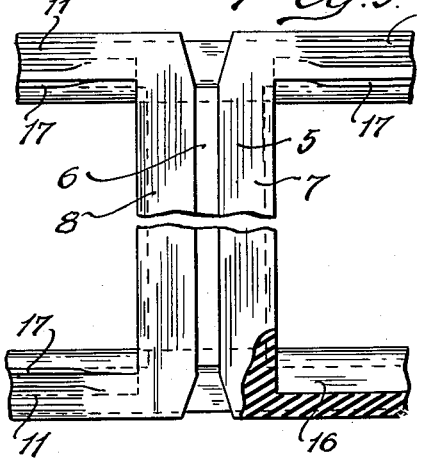
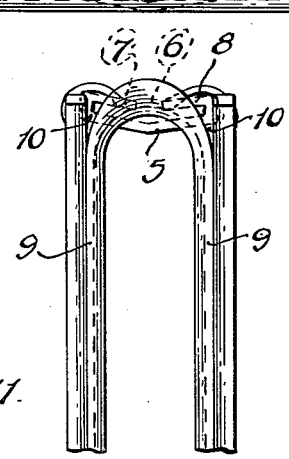
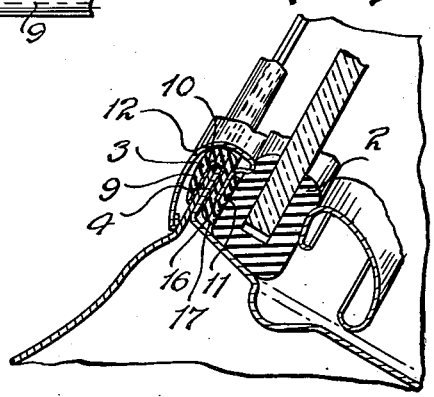
INVENTORS.
JOHN JANOSKOVITS.
BY WILLIAM D. CHILTON.
Barnes, Kisselle, Laughlin & Raisch
ATTORNEYS.

Patented Sept. 29, 1942

2,297,561

UNITED STATES PATENT OFFICE 2,297,561

MACHINE FOR APPLYING CEMENT TO FLEXIBLE STRIPS

John Janoskovits, Detroit, and William D. Chilton, Royal Oak, Mich., assignors to General Motors Corporation, Detroit, Mich., a corporation of Delaware Application October 28, 1940, Serial No. 363,160

7 Claims. (Cl. 91—43)

This invention relates to a machine for applying cement or other adhesive to strips, particularly the weathering or rubber weatherstrip unit used around the windshield panels in the present-day type of automobile bodies. Such a strip is shown and claimed in the application of Roy H. Dean, Serial No. 333,571, filed May 6, 1940.

In the present-day all-metal automobile bodies, the windshield opening is usually defined by a flange projecting into the opening which is usually formed by the overlapping flanges of the front cowl and windshield pillar cover stampings and the top panel stamping. The flanges on these stampings abut with the flanges on the inside windshield frame assembly and form what is known as a pinch-weld flange. This pinch-weld flange has to be properly water-sealed, as do also the windshield panels, and this has been done ordinarily by weatherstrips or flexible weather-frames, such as shown in the Fisher Patent No. 2,061,760 and the Dean application supra. The Dean application involves an improvement over the Fisher weather-sealing in providing a separate light, flexible rubber weather-frame which slips over and straddles the pinch-weld flange and also provides a socket for the decorative chrome-plating molding. This flexible rubber frame and molding is shown in Figs. 6–12 inclusive.

It is the object of this invention to provide a machine in which this flexible rubber weathering frame or similar frames can have cement or adhesive quickly applied thereto.

Referring to the drawings:

Fig. 1 is a side elevation of the machine.

Fig. 2 is an end elevation of the same.

Fig. 3 is a side elevation of the upper part of the machine partly in section.

Fig. 4 is a vertical section through the upper part of the machine.

Fig. 5 is a section taken on the line 5—5 of Fig. 3.

Fig. 6 is a fragmentary view of a windshield equipped with the flexible rubber frame on which this machine performs its work.

Fig. 7 is a detail of the frame at the center pillar.

Fig. 8 is a section on the line 8—8 of Fig. 7.

Fig. 9 is a detail of the back of the flexible frame at the center cross strip.

Fig. 10 is a fragmentary top view of the frame at the center cross strip.

Fig. 11 is a fragmentary view above the center cross strip showing how the frame is doubled upon itself to be applied to the work-carrying wheel of the machine.

Fig. 12 is a vertical cross section through the body at the bottom of the windshield opening showing the weather sealing frame.

Before the machine is described, it will be helpful to first describe the flexible rubber weather-sealing frame upon which it performs its work. Referring to Fig. 6: The typical windshield on the present-day all-metal body is shown. This is encased in a rubber channel frame 1. Referring to Fig. 12: It will be seen that the weathering is made up of a rubber channel strip 2 and a separate rubber strip 3. This separate rubber strip 3 fits over the pinch-weld 4 in the windshield opening. This strip is the frame 3 shown in Fig. 8. It is a molded rubber frame of the shape shown in Fig. 6 with a central cross strip 5. This center cross strip is, on its front face, beveled on each side (as shown in Fig. 7). At the rear of the pillar, the center cross strip has an opening 6 (see Figs. 9 and 10) and flanges 7 and 8 which straddle the metal core (not shown) which forms the center of the center pillar. This is shown and described in the Dean application and need not be repeated here as it is unimportant in understanding the invention described and claimed in this application. The flexible rubber frame 3 has a flange 9. This flange, together with the central web 10, forms a channel adapted to straddle the pinch-weld 4. The central web 10, together with the flange 11, forms another but reversely facing channel pointing inwardly whereas the other channel points outwardly. This second channel is adapted to receive the flange of the chrome-plated decorative molding 12. It is necessary to coat the interior of the pinch-weld channel with cement or adhesive. Heretofore, it has been necessary to do this with a hand-operated tool and this is rather clumsy and time consuming. It is the object of the present machine to provide a machine for assisting this operation.

The machine has a large work-supporting wheel 13 provided with a notch 14 in its periphery. The flexible rubber weatherstrip frame is folded together (as shown in Fig. 11). The center portion designated 15 drops down in the notch 14 in the work wheel. Two folded strip portions are then started on the wheel with the decorative-molding receiving channel 16 fitting over rib 17 on the periphery of the wheel (see Fig. 5). As already stated, the strip is folded (as shown in Fig. 11) and the resulting two decorative-molding receiving channels are fitted over the two ribs 17 (as shown in Fig. 5).

The operator starts the two strip portions on the ribs of the wheel (as shown in Fig. 1). He then steps on foot pedal 33 which operates a switch 34 that controls the motor M which, through suitable reduction gearing (not shown) drives the work wheel shaft 36 through the slip clutch later described. This serves to wind the rubber strip on the work wheel. The strip is held under some tension by the operator as the wheel revolves counterclockwise (as shown in Fig. 1).

The operator holds his foot on the motor switch until the wheel has completely revolved and the flexible weather frame has been fitted onto the wheel. Thereupon, the operator steps on pedal 18. This, through links 19 and 20, pulls down slide 21, cross bar 26, U bracket 27, casting 28 and the guns 29. These fit into the pinch-weld receiving channel (as shown in Fig. 5). It is possible to move or shift the wheel by hand in view of the slip clutch connections hereinafter described. Thereupon, the operator pushes in the lever 37 (Fig. 3) from the full line to the dotted line position. This raises valve 38, opening the cement line to the pressure cement storage tank 32 and closing another switch at 39. The wheel begins again to revolve and the cement is discharged through guns into the pinch-weld flange receiving channel.

After the wheel has completed the necessary revolution, the cam 40 strikes the roll 41 and raises push rod 42 which operates lever 43 (54). This lever 43 throws the switch lever 37 back to the "off" position, closing valve 38 and opening switch 39. Detent 44 engages with shoulder 45 on collar 46 which is secured to shaft 36. Detent 44 is carried on lever 48. Pivoted on the end of the lever 48 is a sleeve 49 through which engages the rod 50, connected at its lower end with gooseneck link 20. (Fig. 1). A nut 51 engages the lower end of the sleeve 49. The helical spring 52 presses the detent lever downwardly. When the pedal 18 is in its raised position, the nut 51 raises the detent lever 48 so that the detent is out of the range of the shoulder 45. When the pedal 18 is pressed down, nuts 53 through spring 52 carry the detent lever down into a position to cause the detent 44 to engage the stop shoulder 45 at the completion of a revolution of the wheel. This stops the rotation of the motor.

The slip clutch, referred to above, is formed by a brake-band 56 which surrounds drum 57 which is part of the drive shaft.

We claim:

1. A machine for applying cement to flexible strips having in combination a wheel on which the strip is fitted with the surface which receives the cement uppermost, a motor for rotating the wheel, a source of fluid cement under pressure and a cement gun arranged to project the fluid cement onto the strip as the wheel revolves, and a switch and valve control for simultaneously connecting the cement gun with a source of fluid cement under pressure and for energizing the motor for rotating the wheel.

2. A machine for applying cement to flexible strips having in combination a wheel on which the strip is fitted with the surface which receives the cement uppermost, a motor for rotating the wheel, means for supplying fluid cement under pressure a cement gun arranged to project the fluid cement onto the strip as the wheel revolves, and an electric switch and a valve control for simultaneously connecting the cement gun with said source of fluid cement under pressure and for energizing the motor for rotating the wheel, and means operating upon said switch and valve control for automatically cutting off the supply of cement and stopping the motor after the wheel has made one revolution.

3. A machine for applying cement to flexible strips having in combination a wheel on which the strip is fitted with the surface which receives the cement uppermost, a motor for rotating the wheel, a source of fluid cement under pressure, a cement gun arranged to project the fluid cement onto the strip as the wheel revolves, and a motor and valve control means for simultaneously connecting the cement gun with said source of fluid under pressure and for energizing the motor, and means for automatically cutting off the supply of cement and stopping the motor after the wheel has made one revolution, comprising a cam on the wheel and a member actuatable thereby having connections with the said simultaneous control for the cement supply and the motor.

4. A machine for applying cement to flexible strips having in combination a wheel provided with a pair of ribs on its perimeter and a large notch in the perimeter, the said ribs arranged to receive a channel of a double channel weatherstrip in the form of a flexible rubber frame with a central connecting portion which frame is folded at its center to provide two runs of the frame strip fitted over the two ribs and the central portion accommodated in said notch and means for applying cement to the other channel of the strip as it is rotated.

5. A machine for applying cement to flexible strips having in combination a wheel provided with a pair of ribs on its perimeter and a large notch in the perimeter, the said ribs arranged to receive a channel of a double channel weatherstrip in the form of a flexible rubber frame with a central connecting portion and which is folded at its center to provide two runs of the frame strip fitted over the two ribs with the central portion accommodated in said notch and means for applying cement to the other channel of the strip as it is rotated, comprising a pair of guns slidably supported, and draft connections therewith arranged to draw the gun ends down into the upstanding channels of the two strip runs, said guns providing cement under pressure which is discharged into the uppermost channels as the wheel is rotated.

6. A machine for applying cement to flexible strips having in combination a wheel provided with a pair of ribs on its perimeter and a large notch in the perimeter, the said ribs arranged to receive a channel of a double channel weatherstrip in the form of a flexible rubber frame which is folded at its center to provide two runs of the frame strip fitted over the two ribs and means for applying cement to the other channel of the strip as it is rotated, comprising a pair of guns slidably supported, and draft connections arranged to draw the gun end down into the upstanding channels of the two strip runs, said guns providing cement under pressure which is discharged into the uppermost channels as the wheel is rotated, and means for automatically stopping the motor and the supply of cement upon one revolution of the work wheel.

7. A machine for applying cement to flexible strips having in combination a wheel on which the strip is fitted with the surface which receives the cement uppermost, means for rotating the wheel and a cement gun arranged to project the fluid cement onto the strip as the wheel revolves, the said means for rotating the wheel including a motor and electric switch control for rotating the wheel to wind the strip initially upon the wheel and a second switch control for the motor causing the wheel to revolve and a valve connected with said gun and operated with said switch for releasing the cement at the same time said wheel rotates a second time.

JOHN JANOSKOVITS.
WILLIAM D. CHILTON.